(12) United States Patent
Nair et al.

(10) Patent No.: US 9,614,864 B2
(45) Date of Patent: Apr. 4, 2017

(54) EXPOSURE OF AN APPARATUS TO A TECHNICAL HAZARD

(71) Applicant: Bank of America Corporation, Charlotte, NC (US)

(72) Inventors: Santosh S. Nair, Kerala (IN); Shikhar Sood, Haryana (IN); Phani Gautham Tenneti, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 72 days.

(21) Appl. No.: 14/511,017

(22) Filed: Oct. 9, 2014

(65) Prior Publication Data

US 2016/0105455 A1 Apr. 14, 2016

(51) Int. Cl.
| | | |
|---|---|---|
| *H04L 29/06* | (2006.01) | |
| *H04L 29/08* | (2006.01) | |
| *G06F 21/57* | (2013.01) | |

(52) U.S. Cl.
CPC ........ *H04L 63/1433* (2013.01); *G06F 21/577* (2013.01); *H04L 63/1466* (2013.01); *H04L 67/02* (2013.01); *H04L 63/168* (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 7,890,869 | B1* | 2/2011 | Mayer | G06F 21/577 709/224 |
| 8,819,442 | B1* | 8/2014 | Gehrig | H04L 63/1433 713/180 |
| 8,893,281 | B1* | 11/2014 | Lee | G06F 21/565 726/25 |
| 2006/0031938 | A1* | 2/2006 | Choi | G06F 21/552 726/25 |
| 2012/0180133 | A1* | 7/2012 | Al-Harbi | H04L 63/1433 726/25 |
| 2012/0203590 | A1* | 8/2012 | Deb | G06Q 10/0635 705/7.28 |
| 2013/0191919 | A1* | 7/2013 | Basavapatna | G06F 21/577 726/25 |
| 2013/0212685 | A1* | 8/2013 | Kelley | G06F 21/577 726/25 |
| 2014/0173739 | A1* | 6/2014 | Ahuja | G06F 21/577 726/25 |
| 2014/0237545 | A1* | 8/2014 | Mylavarapu | H04L 63/1433 726/3 |
| 2015/0381649 | A1* | 12/2015 | Schultz | H04L 63/1433 726/25 |

* cited by examiner

*Primary Examiner* — Jason C Chiang
(74) *Attorney, Agent, or Firm* — Michael A. Springs; Moore & Van Allen PLLC; W. Kevin Ransom

(57) ABSTRACT

Embodiments of the invention are directed to systems, methods and computer program products for determining exposure of an apparatus to a technical hazard and prioritizing technical hazards. An exemplary system is configured to: determine an impact associated with a technical hazard on the apparatus, the impact being initiated by a second apparatus; determine a probability of occurrence of the technical hazard; and determine the exposure of the apparatus based on the impact and the probability.

13 Claims, 4 Drawing Sheets

EXPOSURE OF AN APPARATUS TO A TECHNICAL HAZARD

BACKGROUND

A computing apparatus may be exposed to various kinds of technical hazards. The technical hazards may be associated with modifying the data on the computing apparatus or otherwise obtaining access to the data without having permission to modify or access the data. There is a need to rank these technical hazards so that the computing apparatus can be protected.

BRIEF SUMMARY

In some embodiments, a system is provided for determining exposure of an apparatus to a technical hazard. The system comprises a memory; a processor; and a module stored in the memory, executable by the processor, and configured to: determine an impact associated with a technical hazard on the apparatus, the impact being initiated by a second apparatus; determine a probability of occurrence of the technical hazard; and determine the exposure of the apparatus based on the impact and the probability.

In some embodiments, the technical hazard is associated with modifying, deleting, or accessing data on the apparatus.

In some embodiments, the method further comprises graphically illustrating the exposure of the apparatus.

In some embodiments, the method further comprises prioritizing a first technical hazard over a second technical hazard.

In some embodiments, the technical hazard comprises at least one of an application hazard, an infrastructure hazard, an insider hazard, an electronic commerce hazard, an unauthorized hazard, or a mobile platform hazard.

In some embodiments, the probability is either less than a first threshold, equal to or greater than the first threshold and less than a second threshold, or equal to or greater than the second threshold.

In some embodiments, the impact is either less than a first threshold, equal to or greater than the first threshold and less than a second threshold, or equal to or greater than the second threshold.

In some embodiments, the impact is based on a number of historical instances of the technical hazard over a period of time.

In some embodiments, the impact is based on a Common Vulnerability Scoring System (CVSS) score associated with the technical hazard.

In some embodiments, the impact is based on an average CVSS score for a period of time.

In some embodiments, the impact is further based on determining a complexity of the technical hazard being greater than a threshold complexity.

In some embodiments, the system is further configured to determine a relative exposure of the technical hazard in relation to an exposure of a second technical hazard.

In some embodiments, the system is further configured to determine whether the exposure is within a first threshold exposure level and a second, higher threshold exposure level.

In some embodiments, the impact is further based on determining how the technical hazard is triggered, what type of access to the apparatus is required to trigger the technical hazard, state of technical processes for triggering the technical hazard, how to measure the existence of the technical hazard if it is triggered, and measurement of potential loss if the technical hazard is triggered.

In some embodiments, the impact is further based on a geographical location of the apparatus, a type of apparatus, a network location of the apparatus, and a type of data stored by the apparatus.

In some embodiments, a method is provided for determining exposure of an apparatus to a technical hazard. The method comprises: determining, using a computing device processor, an impact associated with a technical hazard on the apparatus, the impact being initiated by a second apparatus; determining, using a computing device processor, a probability of occurrence of the technical hazard; and determining, using a computing device processor, the exposure of the apparatus based on the impact and the probability.

In some embodiments, a computer program product is provided for determining exposure of an apparatus to a technical hazard. The computer program product comprises a non-transitory computer-readable medium comprising a set of codes for causing a computer to: determine an impact associated with a technical hazard on the apparatus, the impact being initiated by a second apparatus; determine a probability of occurrence of the technical hazard; determine the exposure of the apparatus based on the impact and the probability.

BRIEF DESCRIPTION OF THE DRAWINGS

Figure 1:
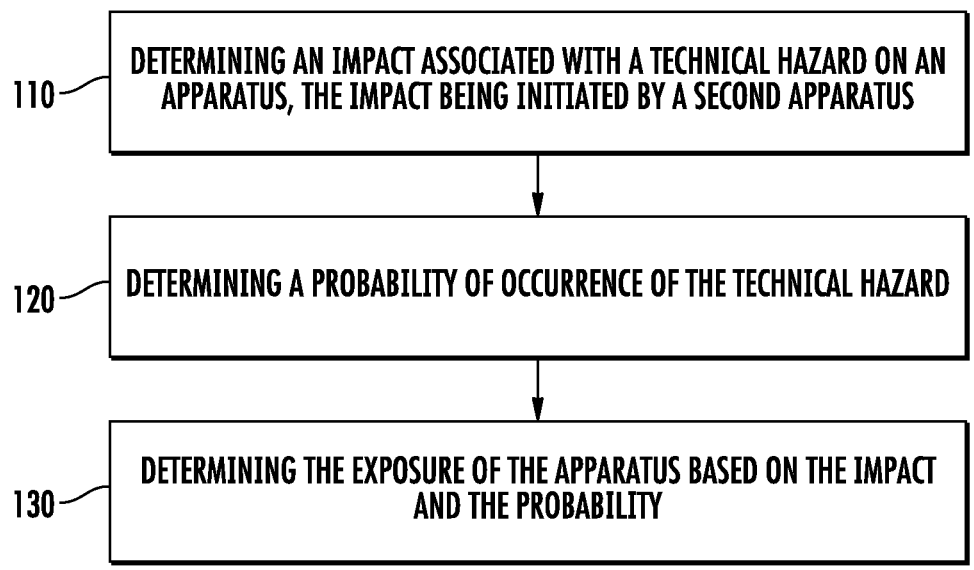
Figure 2:
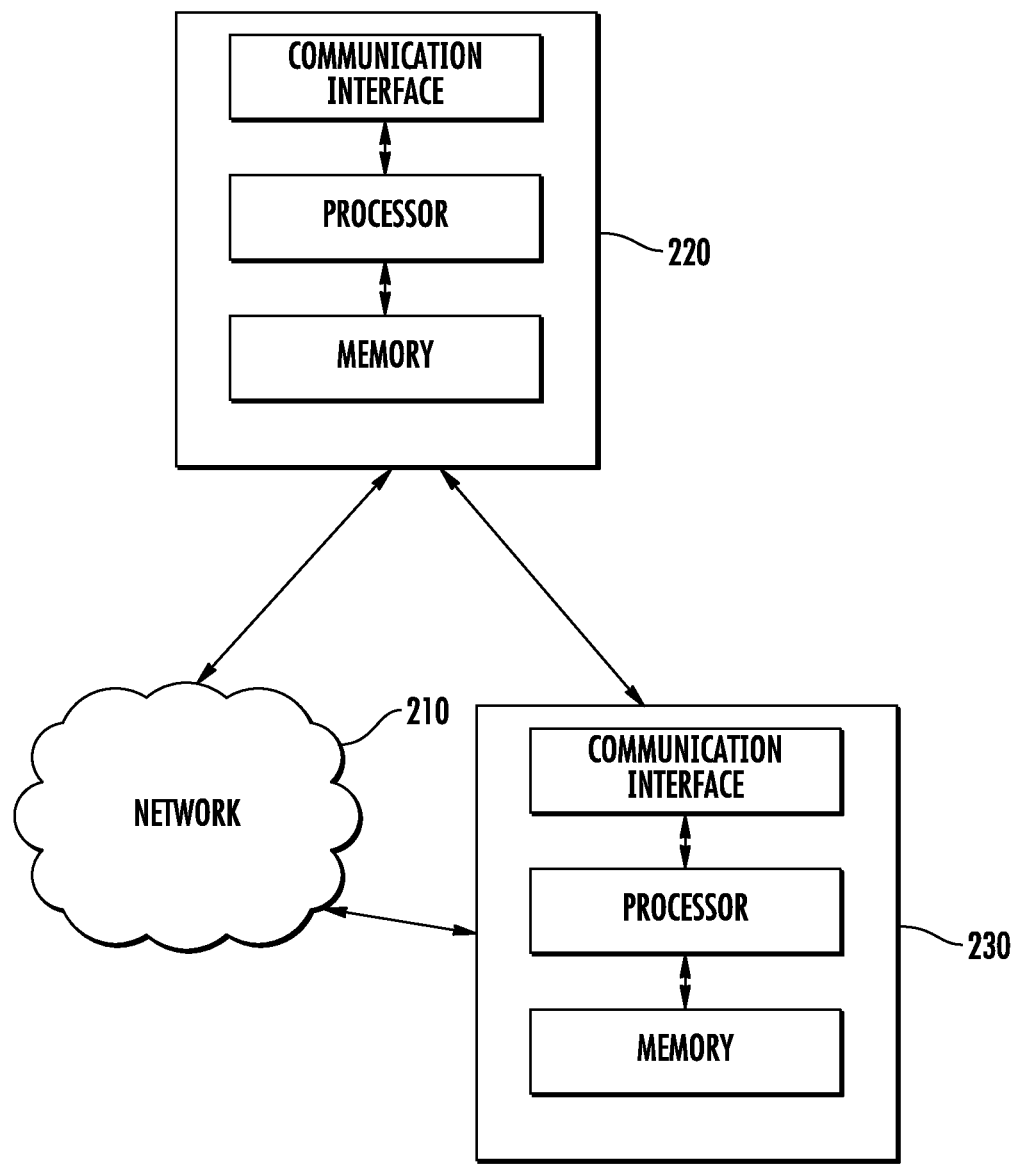
Figure 3:
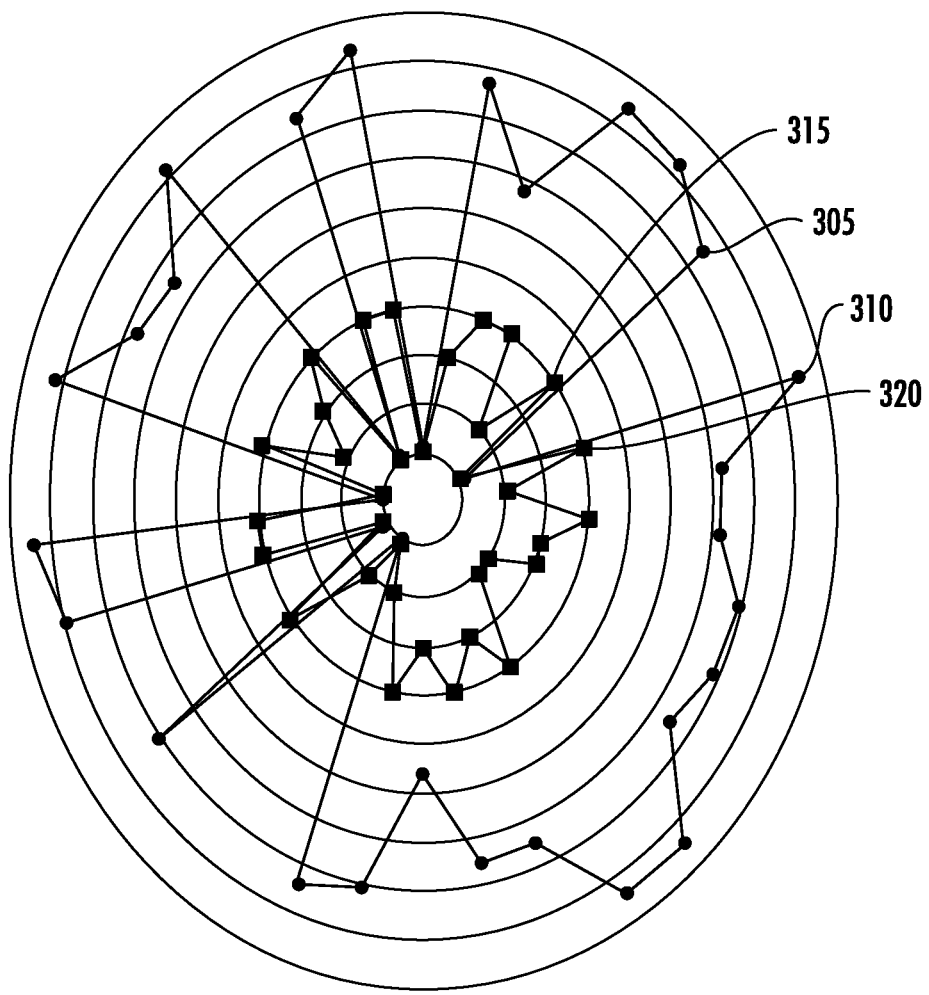
Figure 4:
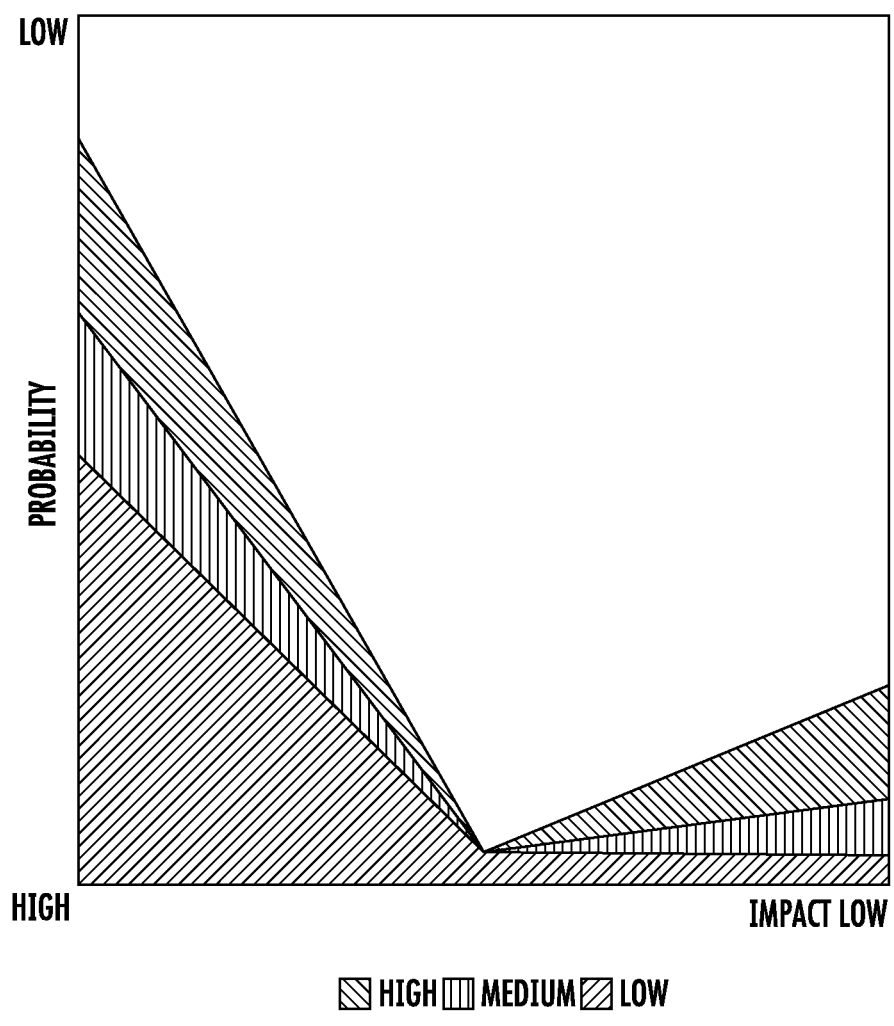

Having thus described embodiments of the invention in general terms, reference will now be made to the accompanying drawings, where:

FIG. 1 is an exemplary method for determining exposure of an apparatus to a technical hazard, in accordance with embodiments of the present invention;

FIG. 2 is a block diagram illustrating technical components of an environment for implementing the various processes described herein, in accordance with embodiments of the present invention;

FIG. 3 is a first graphical illustration of an exposure priority chart associated with an apparatus described herein, in accordance with embodiments of the present invention;

FIG. 4 is a second graphical illustration of an exposure priority chart associated with an apparatus described herein, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for determining exposure of an apparatus to a technical hazard. Referring now to FIG. 1, FIG. 1 presents an exemplary method for determining exposure of an apparatus to a technical hazard. At block 110, the method comprises determining an impact associated with a technical hazard on the apparatus, the impact being initiated by a second apparatus. At block 120, the method comprises determining a probability of occurrence of the technical hazard. At block 130, the method comprises determining the exposure of the apparatus based on the impact and the probability.

The technical hazard comprises at least one of an application hazard (e.g., a hazard associated with a software application hosted by the apparatus or stored on the apparatus), an infrastructure hazard (e.g., a hazard associated with the physical apparatus), an insider hazard (e.g., a hazard associated with a user of the apparatus), an electronic commerce hazard (e.g., a hazard associated with a transaction processed by the apparatus), an unauthorized hazard (e.g., an unauthorized modification, deletion, addition, or access of data stored on the apparatus by a user or second apparatus that does not have the credentials and/or privileges to perform a task with respect to the data), or a mobile platform hazard (e.g., a hazard associated with accessing an application hosted by the apparatus on a mobile device). Some hazards may be a combination of any of the hazards described herein. Therefore, any feature of a technical hazard described herein may be associated with a set of multiple technical hazards.

Examples of technical hazards include cross-site scripting (injecting code into webpages), denial of service, Domain Name System (DNS) spoofing, enumeration (e.g., retrieving network usernames), injection hazards (entering SQL statements into an entry field for execution), logic hazards, malware, operating system hazards, operating session hazards, phishing, social engineering, spam, hardware hazards, telephony hazards (associated with a communication network), zero-day hazards, or the like.

The determination of technical hazards (e.g., any of the technical hazards described herein) is achieved through specialized computer hardware. For example, a specific physical integrated chip that is specific for a particular technical hazard (or a group of particular technical hazards) needs to be attached to a physical computing device that is being monitored. The integrated chip may either be an external attachment or an internal attachment. For example, an external attachment is an attachment that is attached to the computer via a Universal Serial Bus (USB) slot (e.g., a personal computing system or a mobile device such as a mobile phone). An internal attachment is an attachment that is attached to an integrated circuit board in the computing system (e.g., a personal computing system or a mobile device such as a mobile phone). In some embodiments, determination of some technical hazards requires both an external and internal attachment. In some embodiments, the specific integrated chip may determine more than one technical hazard. The present invention enables identification of multiple technical hazards (including multiples types of technical hazards as described previously), thereby enabling data integrity and preventing data being compromised from computing systems. In some embodiments, a single piece of hardware that is attached to the system enables determination of multiple types of technical hazards. Therefore, any computing system to which the integrated chip is attached is improved because the computing system offers a more secure computing experience to a user. In some embodiments, the integrated chip may also act as a firewall such that any communication to and from the computing system is accomplished via the integrated chip.

The probability is either less than a first threshold (low), equal to or greater than the first threshold and less than a second threshold (medium), or equal to or greater than the second threshold (high). The impact is either less than a first threshold (low), equal to or greater than the first threshold and less than a second threshold (medium), or equal to or greater than the second threshold (high).

As illustrated later in FIGS. 3 and 4, the present invention is directed to graphically illustrating the exposure of the apparatus. The graphical illustrations indicate how the impact and probability of a first technical hazard compares to the impact and probability of a second technical hazard. Therefore, the present invention may prioritize a first technical hazard over a second technical hazard.

In some embodiments, an apparatus is configured to determine relative exposure of a first technical hazard in relation to a second technical hazard. The apparatus may make this determination based on information associated with each technical hazard such as the complexity of the technical hazard (e.g., whether the technical hazard has a complexity level less than a first threshold, equal to or greater than the first threshold and less than a second threshold, or equal to or greater than the second threshold), Common Vulnerability Scoring System (CVSS) score associated with each technical hazard, or the like. Each technical hazard may be associated with an acceptable range of exposure levels. Therefore, the apparatus is further configured to determine whether the exposure of the system to a first technical hazard is within a range comprising a first threshold exposure level and a second, higher threshold exposure level. The apparatus may make this determination based on CVSS scores associated with each technical hazard, standard deviation of the CVSS scores, number of historical instances of the technical hazard over a period of time, or the like.

The apparatus is further configured to determine the exposure of the apparatus to a technical hazard based on the complexity of the technical hazard (e.g., whether the technical hazard has a complexity level less than a first threshold, equal to or greater than the first threshold and less than a second threshold, or equal to or greater than the second threshold), and based on how the exposure of an apparatus to a technical hazard changes over time (time-based derivatives).

The apparatus is further configured to determine the impact (and/or exposure) of a technical hazard based on a product of (1) a change in average CVSS score of the technical hazard divided by a period of time and (2) a summation of the CVSS score(s) for a technical hazard divided by a number of historical instances of the technical hazard over the period of time (e.g., the same period of time as in the first step). In some embodiments, the impact is further based on determining a complexity of the technical hazard.

In some embodiments, the impact is further based on determining how the technical hazard is triggered, what type of access to the apparatus is required to trigger the technical hazard, state of technical processes that may be used to trigger the technical hazard, how to measure the existence of the technical hazard if it is triggered, potential loss (e.g., data loss) if the technical hazard is triggered.

In some embodiments, the impact is further based on a geographical location of the apparatus (e.g., determined using a global positioning system (GPS) located in the apparatus), the type of apparatus (mobile apparatus, non-mobile apparatus, tablet computing device, or the like), a network location of the apparatus, the type of data stored by the apparatus, or the like.

Referring now to FIG. 2, FIG. 2 presents an exemplary block diagram of the network environment for implementing the method described herein, in accordance with embodiments of the present invention. As illustrated, the environment includes a network 210, a first apparatus 220, and a second apparatus 230. As shown in FIG. 2, the first apparatus 220 and the second apparatus 230 are each operatively and selectively connected (e.g., via one or more wired or wireless mechanisms) to the network 210, which may include one or more separate networks. The first apparatus 220 may have been granted access to the network 210, but the second apparatus 220 may have obtained access to the network 210 with or without permission from the network 210. The second apparatus 220 may obtain access to the first apparatus 220 (without proper authentication and/or privileges) either directly or via the network 210.

Each of the first apparatus 220 and the second apparatus 230 is a computing device that comprises a communication interface, a processor, a memory, and a module stored in the memory, executable by the processor, and configured to perform the various processes described herein. The first apparatus or the second apparatus may comprise at least one of a mobile computing device, a non-mobile computing device, a server, a kiosk, a tablet, an e-reader, a television, or the like.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the apparatus in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the apparatus in which it resides to implement the functions of that system.

Referring now to FIG. 3, FIG. 3 is a first graphical illustration of an exposure priority chart associated with an apparatus. The exposure priority chart is a spider chart that illustrates the impact and probability for technical hazards associated with an apparatus. Point 305 and Point 315 illustrate the impact and probability, respectively, for a first technical hazard. Point 310 and Point 320 illustrate the impact and probability, respectively, for a second technical hazard.

Referring now to FIG. 4, FIG. 4 is a second graphical illustration of an exposure priority chart associated with an apparatus. The probability is illustrated on the x-axis and the impact on the y-axis. The three bands listed are the high, medium, and low bands. Technical hazards may be plotted on this graph, thereby enabling a user to visualize the impact and probability of each technical hazard.

In accordance with embodiments of the invention, the term "module" with respect to an apparatus may refer to a hardware component of the apparatus, a software component of the apparatus, or a component of the apparatus that includes both hardware and software. As used herein, a module may include one or more modules, where each module may reside in separate pieces of hardware or software. As used herein, an apparatus may alternatively be referred to as a "system" or a "device."

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, apparatus, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system" or "apparatus." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for determining exposure of an apparatus to a technical hazard, the apparatus comprising:
   a memory;
   a processor; and
   a module stored in the memory, executable by the processor, and configured to:
   receive information associated with one or more technical hazards from one or more specialized computer hardware comprising integrated chips operatively connected to the apparatus, wherein the one or more specialized computer hardware is internally attached to the apparatus, wherein being internally attached comprises being attached to an integrated circuit board in the apparatus;
   determine an impact associated with the one or more technical hazards on the apparatus, the impact being initiated by a second apparatus, wherein the impact is further based on determining how the one or more technical hazards are triggered, state of technical processes for triggering the one or more technical hazards, how to measure the existence of the one or more technical hazards if they are triggered, a number of historical instances of the technical hazard over a period of time, and measurement of potential loss if the one or more technical hazards are triggered;
   determine an access type associated with the second apparatus's access to the first apparatus, wherein the access type is associated with at least an authentication level;
   determine a probability of occurrence of the technical hazard based on at least the access type and the number of historical instances of the technical hazard over a period of time;
   determine the exposure of the apparatus based on the impact and the probability, wherein determining the exposure of the apparatus further comprises determining a relative exposure of each of the one or more technical hazards relative to each other based on at least a complexity level associated with the one or more technical hazards to thereby determine a priority for each of the one or more technical hazards; and
   generate a graphical illustration of an exposure priority chart associated with the apparatus, wherein the exposure priority chart is a spider chart that illustrates the impact and probability for each of the technical hazards associated with the apparatus.

2. The system of claim 1, wherein the one or more technical hazards is associated with modifying, deleting, or accessing data on the apparatus.

3. The system of claim 1, further comprising prioritizing a first technical hazard over a second technical hazard.

4. The system of claim 1, wherein the one or more technical hazards comprises at least one of an application hazard, an infrastructure hazard, an insider hazard, an electronic commerce hazard, an unauthorized hazard, or a mobile platform hazard.

5. The system of claim 1, wherein the probability is either less than a first threshold, equal to or greater than the first threshold and less than a second threshold, or equal to or greater than the second threshold.

6. The system of claim 1, wherein the impact is either less than a first threshold, equal to or greater than the first threshold and less than a second threshold, or equal to or greater than the second threshold.

7. The system of claim 1, wherein the impact is based on a Common Vulnerability Scoring System (CVSS) score associated with the technical hazard.

8. The system of claim 1, wherein the impact is based on an average Common Vulnerability Scoring System (CVSS) score for a period of time.

9. The system of claim 1, wherein the impact is further based on determining a complexity of the one or more technical hazards being greater than a threshold complexity.

10. The system of claim 1, wherein the impact is further based on a geographical location of the apparatus, a type of apparatus, a network location of the apparatus, and a type of data stored by the apparatus.

11. The system of claim 1, wherein the apparatus is further configured to determine whether the exposure is within a first threshold exposure level and a second, higher threshold exposure level.

12. A method for determining exposure of an apparatus to a technical hazard, the method comprising:
  receiving, using a computing device processor, information associated with one or more technical hazards from one or more specialized computer hardware comprising integrated chips operatively connected to the apparatus, wherein the one or more specialized computer hardware is internally attached to the apparatus, wherein being internally attached comprises being attached to an integrated circuit board in the apparatus;
  determining, using a computing device processor, an impact associated with the one or more technical hazards on the apparatus, the impact being initiated by a second apparatus, wherein the impact is further based on determining how the one or more technical hazards are triggered, state of technical processes for triggering the one or more technical hazards, how to measure the existence of the one or more technical hazards if they are triggered, a number of historical instances of the technical hazard over a period of time, and measurement of potential loss if the one or more technical hazards are triggered;
  determining, using a computing device processor, an access type associated with the second apparatus's access to the first apparatus, wherein the access type is associated with at least an authentication level;
  determining, using a computing device processor, a probability of occurrence of the technical hazard based on at least the access type and the number of historical instances of the technical hazard over a period of time;
  determining, using a computing device processor, the exposure of the apparatus based on the impact and the probability, wherein determining the exposure of the apparatus further comprises determining a relative exposure of each of the one or more technical hazards relative to each other based on at least a complexity level associated with the one or more technical hazards to thereby determine a priority for each of the one or more technical hazards; and
  generating, using a computing device processor, a graphical illustration of an exposure priority chart associated with the apparatus, wherein the exposure priority chart is a spider chart that illustrates the impact and probability for each of the technical hazards associated with the apparatus.

13. A computer program product for determining exposure of an apparatus to a technical hazard, the computer program product comprising:
  a non-transitory computer-readable medium comprising a set of codes for causing a computer to:
    receive information associated with one or more technical hazards from one or more specialized computer hardware comprising integrated chips operatively connected to the apparatus, wherein the one or more specialized computer hardware is internally attached to the apparatus, wherein being internally attached comprises being attached to an integrated circuit board in the apparatus;
    determine an impact associated with the one or more technical hazards on the apparatus, the impact being initiated by a second apparatus, wherein the impact is further based on determining how the one or more technical hazards are triggered, state of technical processes for triggering the one or more technical hazards, how to measure the existence of the one or more technical hazards if they are triggered, a number of historical instances of the technical hazard over a period of time, and measurement of potential loss if the one or more technical hazards are triggered;
    determine an access type associated with the second apparatus's access to the first apparatus, wherein the access type is associated with at least an authentication level;
    determine a probability of occurrence of the technical hazard based on at least the access type and the number of historical instances of the technical hazard over a period of time;
    determine the exposure of the apparatus based on the impact and the probability, wherein determining the exposure of the apparatus further comprises determining a relative exposure of each of the one or more technical hazards relative to each other based on at least a complexity level associated with the one or more technical hazards to thereby determine a priority for each of the one or more technical hazards; and
    generate a graphical illustration of an exposure priority chart associated with the apparatus, wherein the exposure priority chart is a spider chart that illustrates the impact and probability for each of the technical hazards associated with the apparatus.

* * * * *